(12) United States Patent
Dawson et al.

(10) Patent No.: US 8,228,924 B2
(45) Date of Patent: Jul. 24, 2012

(54) AC PLC TO DC PLC TRANSCEIVER

(75) Inventors: Thomas Dawson, Escondido, CA (US); Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 563 days.

(21) Appl. No.: 11/279,205

(22) Filed: Apr. 10, 2006

(65) Prior Publication Data

US 2006/0269001 A1    Nov. 30, 2006

Related U.S. Application Data

(60) Provisional application No. 60/685,181, filed on May 26, 2005.

(51) Int. Cl.
*H04L 12/28* (2006.01)
*H04L 12/56* (2006.01)

(52) U.S. Cl. .................................. 370/401; 370/419
(58) Field of Classification Search .............. 340/310.17
See application file for complete search history.

(56) References Cited

U.S. PATENT DOCUMENTS

| | | | |
|---|---|---|---|
| 6,373,377 B1 * | 4/2002 | Sacca et al. ................ | 375/257 |
| 6,658,049 B1 * | 12/2003 | McGhee et al. .............. | 375/211 |
| 6,965,302 B2 | 11/2005 | Mollenkopf | |
| 6,965,303 B2 | 11/2005 | Mollenkopf | |
| 6,972,688 B2 | 12/2005 | Rapaich | |
| 7,023,324 B2 * | 4/2006 | Kodama et al. ............. | 375/260 |
| 7,136,936 B2 * | 11/2006 | Chan et al. .................. | 709/250 |
| 7,401,239 B2 * | 7/2008 | Chan et al. .................. | 713/300 |
| 2002/0060624 A1 * | 5/2002 | Zhang ..................... | 340/310.01 |
| 2002/0080010 A1 * | 6/2002 | Zhang ..................... | 340/310.06 |
| 2003/0055962 A1 * | 3/2003 | Freund et al. ................ | 709/225 |
| 2005/0015805 A1 | 1/2005 | Iwamura | |
| 2005/0203647 A1 | 9/2005 | Landry | |
| 2005/0249245 A1 | 11/2005 | Hazani | |
| 2005/0273282 A1 | 12/2005 | Mollenkopf | |
| 2006/0061329 A1 | 3/2006 | Dawson | |

OTHER PUBLICATIONS

Dostert, Klaus, "Powerline Communication", Dostert, Klaus, Powerline Communication, Prentice Hall, ISBN 0-13-029342-3 Jun. 20, 2001, pp. 2-41.
Heiskala, Juha et al., "Ofdm Wireless Lans: A Theoretical and Practical Guide", Sams Publisher, ISBN 978-0-672-32157-3 Dec. 21, 2006, pp. 2-41.
Spurgeon, Charles E., "Ethernet; The Definitive Guide", O'Reilly Media, Inc. ISBN 978-1-5659-2660-8 Feb. 9, 2000, pp. 101-122.
Intellon Corp., "What is Powerline Communications?", www.intellon.com, Web Site, May 29, 2009 (download date), Feb. 15, 2005 (date of publication via archive.org records), pp. 1-2.

* cited by examiner

*Primary Examiner* — Anh-Vu H Ly
*Assistant Examiner* — Cassandra Decker
(74) *Attorney, Agent, or Firm* — Fitch, Even, Tabin & Flannery, LLP

(57) ABSTRACT

A device that provides an interface between alternating current powerline communication signals and direct current powerline communication signals. In one embodiment alternating current powerline communication signals and direct current powerline communication signals are interfaced with a bridging device. In another embodiment, a router configuration allows dissimilar protocols to be interfaced to direct current using a router configuration. In yet another embodiment the alternating current powerline communication and direct current powerline communication signals are interfaced using a passive repeater configuration. In the bridge and router configurations, use of an internal computer allows for additional features, such as error checking, buffering, diagnostics, and virus checking.

22 Claims, 7 Drawing Sheets

AC PLC TO DC PLC TRANSCEIVER

CROSS-REFERENCE TO RELATED APPLICATION

This application claims priority under 35 U.S.C. 119(e) to U.S. Provisional Patent Application No. 60/685,181, filed May 26, 2005, for AC TO DC BRIDGE FOR POWER LINE COMMUNICATIONS (PLC) NETWORKS, which United States provisional patent application is hereby fully incorporated herein by reference.

BACKGROUND

1. Field of the Invention

The present invention relates to power line communications, more particularly to DC (direct current) powerline communication (PLC) networks, and AC (alternating current) to DC (direct current) powerline communication (PLC) interfaces.

2. Description of the Related Art

Powerline communication (PLC) network technology allows the transfer of computer data signals over power lines, such as alternating current (AC) powerlines commonly found in residential and office buildings. Powerline communication network technology facilitates the networking of (i.e. providing of data interconnectivity within) homes and offices without the additional installation of dedicated Ethernet cables or the reduced reliability and security concerns that come with wireless networks.

For an overview of powerline communication network technology see Powerline Communications by Klaus Dostert (Prentice Hall, ISBN 0-13-029342-3).

An example of a powerline communication network technology uses the X10 protocol to transfer data over AC power lines. The X10 protocol is commonly used for home operated devices, such as lights and switches. In the X.10 standard, the transmission of data is synchronized to the zero crossing of the AC signal using a 120 kHz tone burst superimposed on the AC signal. The home operated devices filter and decode these tone bursts to initiate commands that control the properties of these devices.

Another example of a powerline network technology uses the HOMEPLUG™ (Homeplug Alliance) protocol (see www.homeplug.org). The Homeplug protocol is designed to transfer information for devices that use such standards as HDTV, SDTV, and audiophile quality stereo in the house. The simplicity of installing consumer products, simply by plugging in a device, is important feature of the standard.

The Homeplug standard data is synchronized on the zero crossing of the AC signal. As the voltage on the line rises, Data is transferred with a superimposed AC signal ranges from 1-30 MHz. The frequency of this superimposed signal allows an effective payload transfer transfer rate of about 50-60 Mbs.

Heretofore, powerline communications are designed to operate on AC power supply lines. In the United States this is typically 120 Volts AC operating at 60 Hz. In most European countries the voltage is 220-240 Volts AC operating at 50 Hz. In Japan the voltage is 100 Volts AC operating at both 50 Hz and 60 Hz.

In accordance with heretofore known power communications networks, network communication signals are introduced into the 100-240 Volts AC power supply lines via a powerline communications transceiver. These network communication signals may originate either with the power utility provider (external to the structure) or by a device that is internal to the residential, office building, or campus of buildings. These data signals are then received and processed by a powerline communications transceiver. The powerline communications transceiver is connected to the powerline communications network through a plug that is inserted into an AC outlet in a conventional manner.

SUMMARY

The object of the present invention is to provide a communications interface between direct current powerline communication (DC PLC) data format and other data formats. These other formats include the alternating current powerline communications (AC PLC), ethernet, and other proprietary and non-proprietary formats.

In one of the embodiments the direct current powerline communications interface is configured as a bridging device. In another of the embodiments, the direct current powerline communication interface is configured as a router, providing protocol translation between the direct current powerline communication interface, the alternating current powerline communication interface, and other data formats. In another embodiment, the direct current powerline communication interfaces is configured as a repeater, utilizing passive analog circuitry to perform the translation.

The direct current powerline communication interface is not limited, but can also provide diagnostic, error checking, and buffering functions on the data that is communicated by the device through the interfaces.

DESCRIPTION OF THE DRAWINGS

These and other features, aspects, and advantages of the present invention will become better understood with regard to the following description, appended claims, and accompanying drawings.

DESCRIPTION

Figure 1:
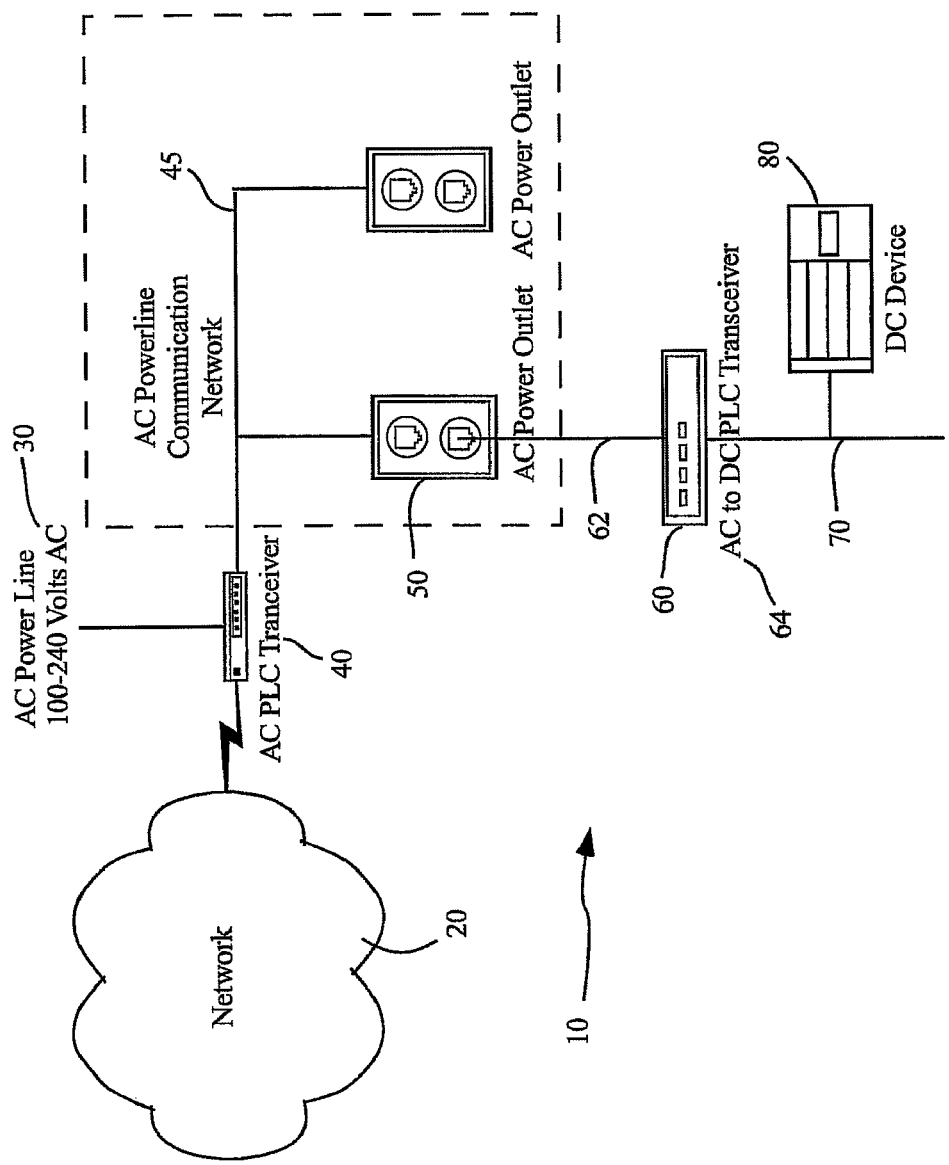
FIG. 1. is a systems diagram of one embodiment of a powerline communication network where an AC powerline communication network and a DC powerline communication network are connected by an AC to DC powerline communication transceiver.

While describing the invention and its embodiments various terms will be used for the sake of clarity. These terms are intended to not only include the recited embodiments, but also all equivalents that perform substantially the same function, in substantially the same manner to achieve the same result.

In accordance with various embodiments of the present invention, a DC (direct current) power supply line is employed to provide DC powerline communications through a DC powerline communications network. In DC powerline communication the network communication signals are fed onto a direct current voltage line. A device with a DC powerline communication receiver receives and decodes the control and data signals from the DC line.

Devices operated by DC are available in the both residential and commercial applications. DC lighting is available in incandescent, halogen, and fluorescent technologies. DC LED (light emitting diode) technology is also emerging as a lighting source. Solenoid operated sprinkler valves using DC voltages are widely available and used in both commercial and residential applications. In similar applications, DC powered residential applications include alarm systems. In some cases, DC is chosen as a primary voltage source for certain applications that are powered by alternative energy sources, such as, solar power.

A similar need exists for DC powerline communications (DC PLC). In DC powerline communications the network communication signals are fed onto a direct current voltage line. A powerline communication transmitter feeds the control and data signals onto the DC line. A device with a DC powerline communication receiver receives and decodes the control and data signals from the DC line. A device may utilize both a DC powerline communication transmitter and receiver to allow for control and device status querying capabilities.

The use of DC power in the home is usually limited to low voltage applications. For example, automatic sprinkler systems typically use DC for sprinkler valve control. Likewise most outdoor lights, intercom systems, and gate control are also controlled by DC power. In these systems the device is usually operated by the application of DC power itself in a two wire configuration. This requires that a separate pair of wires be extended from the controller to the device in a "star" configuration. The total wiring distance is then equal to the total length from the controller to each device. In some installations, the cost of this extra wiring may be prohibitive.

In another configuration, the devices are permanently connected to a DC power line and are controlled by a separate line. This separate line may be connected to a relay that switches the power to the DC device. In this configuration, the DC power line distance is reduced to the maximum distance to the farthest device, but, there is an added cost and complexity due to an additional control wire running to each device.

DC powerline communication uses the DC power lines to both power and the devices, such as sprinkler valves, outdoor lights, security lights, and gate entrances. The advantage of DC powerline communication in this application is the ease of installation of peripheral devices. A computer controlled device is simply attached to the DC power line. This simplifies outdoor wiring since the same power line can be connected to the lights and the sprinklers.

DC powerline communication also simplifies other application areas. For example, automotive applications have a 12 VDC power supply and wiring harnesses to control such devices as valves and turn signals. A DC powerline communication system could replace the wiring harnesses. This would reduce manufacturing costs and allow for greater flexibility in peripheral devices that could be installed in the automobile.

Likewise, airplanes are now equipped with a DC power supply for passengers to keep their laptops charged. A DC powerline communication system could be used to route communication signals (e.g. ethernet) to the laptops without the need for rewiring. This would eliminate the need to rewire and install hardwired ethernet connections in each of the passenger seats. Also, a DC powerline communication system would eliminate the need to install a wireless communication system (e.g. wi-fi) that could interfere other operations on the plane.

In the hobbyist and entertainment application areas, it is not unusual to have certain devices controlled by separate DC power that are brought back to a wiring harness. For example, the speed of slot cars are controlled by a varying voltage that is passed via electrical connections on the track. With DC powerline communication, a constant DC power is applied to the slot car and the speed is controlled via signals that are passed to the slot car. The also allows the slot cars to have added features, such as turn signals and headlights, that are also computer controlled. Also, the same concept may be applied to model railroad systems, where hobbyists need to connect numerous trains, switches, and lights to a central power line.

In the application area of battery powered devices, it is not uncommon for these devices to be connected to a DC charging system. With DC powerline communication, a communications link can be established with the device while it is connected to power supply. This provides an easy way for consumer products to connect to data communication networks (e.g. the ethernet) without additional wiring or expensive wireless interfaces.

In each of the aforementioned application areas, the use of DC powerline communication is desirable. Consequently, there exists a need to bridge the AC powerline communication control signals with the DC powerline communication signals. This AC to DC powerline communication transceiver would simplify the installation of DC powerline communication networks since a separate DC powerline communication controller is not required. Likewise, AC powerline communication networks would have added flexibility in monitoring devices on DC powerline communication networks.

AC to DC PLC Network

Referring to FIG. 1, a system diagram is shown of one embodiment of an AC powerline communication to DC powerline communication network 10.

A data network 20 (e.g. the internet) is connected to an AC powerline communication transceiver 40 by a data communications link. The AC powerline communication transceiver 40 is connected to an AC power line 30 (100-240 Volts AC) and an AC powerline communication network 45. The AC powerline communication network 45 are connected to an AC power outlet 50. An AC to DC powerline communication transceiver 60 is connected to an AC power outlet 50 by an AC port 62 on the AC to DC powerline communication transceiver 60. The AC to DC powerline communication transceiver 60 contains the AC port 62 and a DC port 64. The DC port 64 on the AC to DC powerline communication transceiver 60 is connected to a DC powerline communication network 70. The DC powerline communication network 70 is connected to a DC power 90 and a DC device 80.

The general operation of the AC powerline communication to DC powerline communication network 10 consists of the AC powerline communication network 45 being coupled to the DC powerline communication network 70 via the AC to DC powerline communication transceiver 60.

The signals on the AC powerline communication network 45 are generated when the data network 20 is connected to the power line 30 (100/115/220 VAC) by the AC powerline communication transceiver 40. The data network 20 can be either proprietary or non-proprietary (e.g. internet data).

The signals on the DC powerline communication network 70 are generated from the AC to DC powerline communication transceiver 60. The AC to DC powerline communication transceiver 60 is electrically connected to a DC power source. The DC device 80 is connected to the DC powerline communication network 70.

During operation, the data network 20 sends and receives data packets (not shown) to the AC powerline communication transceiver 40. These data packets may be proprietary or non-proprietary (e.g. the Internet). The AC powerline transceiver superimposes the data packets on the AC power line 30 to produce AC powerline communication network 45.

The AC powerline communication network 45 are transmitted to all AC power outlets 50. The AC power outlet 50 provides a mechanical and electrical connection in the office or residential structure. The AC to DC powerline communication transceiver connects to the AC power outlet 50 using the AC power cable 62.

The AC to DC powerline communication transceiver 60 receives a signal on the AC powerline communication network 45 from the AC power cable 62. The AC to DC powerline communication transceiver 60 filters the AC powerline communication signals using high pass filter (not shown). The AC data packets (not shown) are processed by the internal circuitry of the AC to DC powerline communication transceiver 60 to create the DC voltage (not shown).

The DC data packets (not shown) are superimposed on the DC power creating the DC powerline communication network 70. The DC device 80 is connected to the DC powerline communication network 70 using a data and power format that is compatible with the data and power formats of the AC to DC powerline communications transceiver 60.

The detailed operation of the data network 20 typically consists of a data message (not shown) being sent from the data network 20 and queued in the AC powerline communication transceiver 40. The data network 20 may generate data that is proprietary or non-proprietary (e.g. internet) in format. In systems that conform to either the HOMEPLUG™ (Homeplug Power Alliance) standard or the X10™ (X10 LTD Corporation) standard, data messages are transmitted on the AC powerline communication network 45. This data message would have a destination address for a device connected to the AC powerline communication transceiver 40.

The AC to DC powerline communication transceiver 60 is connected to the AC power outlet 50. The AC to DC powerline communication transceiver 60 detects and extracts the AC data packet present on the AC powerline communication network 45 and superimposes the DC data packet on the DC powerline communication network 70. The DC data packet is detected by the DC device 80.

Data packets originating in the DC device 80 are transmitted to the data network 20 through the AC to DC powerline transceiver 60 using the DC powerline communication network 70, then to the AC powerline transceiver 40 using the AC powerline communication network 45.

DC PLC Network

Figure 2:
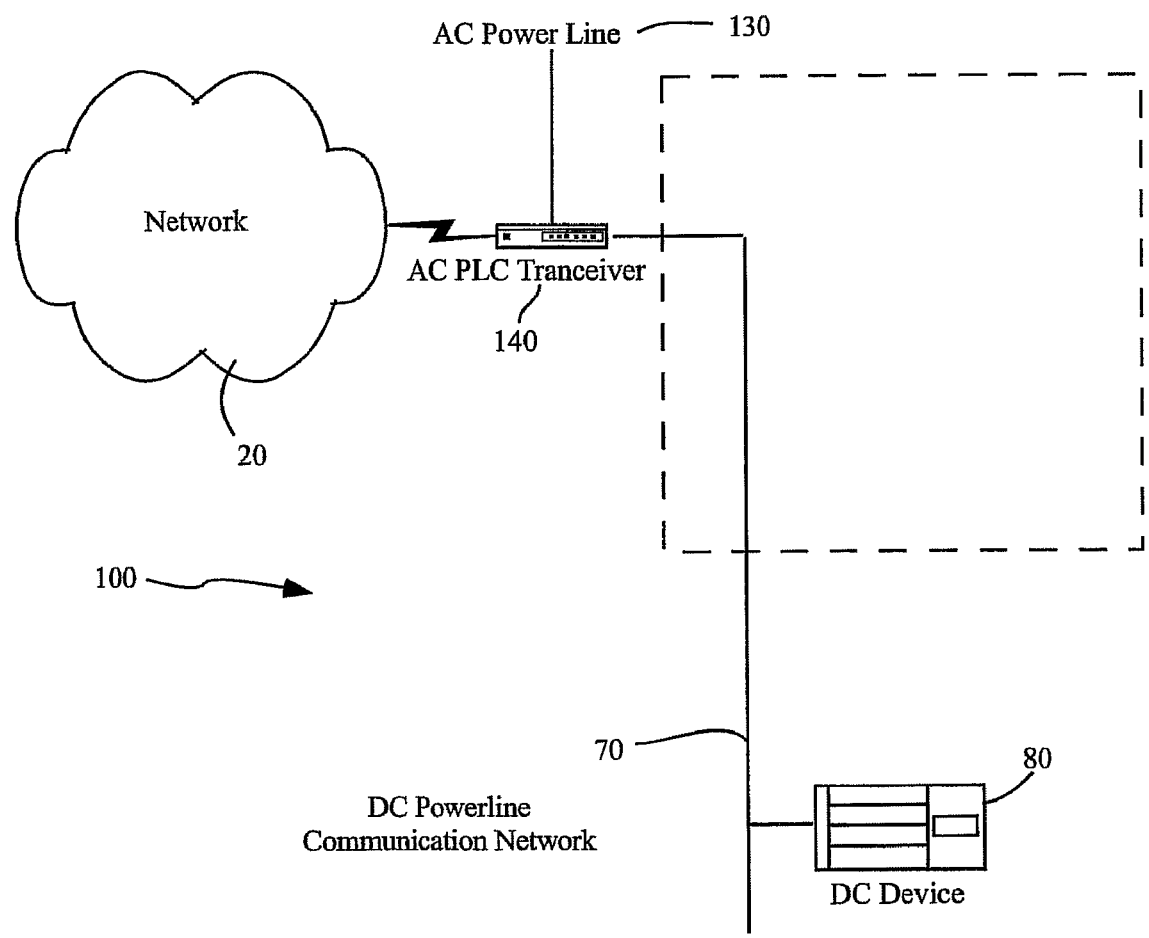
FIG. 2. is a systems diagram of another embodiment of a powerline communication network, such as shown in FIG. 1, where a DC powerline communication network is connected to a data network through a DC powerline communication transceiver.

Referring now to FIG. 2, a system diagram is shown of another embodiment of a DC powerline communication system 100. The data network 20 and the DC device 80 are connected by a DC powerline communication transceiver 140.

As shown in FIG. 2, the data network is connected to the DC powerline communication transceiver 140. The DC powerline communication transceiver 140 is connected to a DC powerline communication network 70. The DC powerline communication network 70 is connected to the DC powerline communication transceiver 140 and the DC device 80.

Data packets originating in the data network 20 are transmitted to the DC powerline communication transceiver 140. The DC powerline communication transceiver 140 receives the data packets and the DC power line 130 to produce signals to conform to the DC powerline communication network 70. Data packets on the DC powerline communication network 70 are received by the DC device 80.

Data packets generated by the DC device 80 are sent on the DC powerline communication network 70. This data packet is received by the DC powerline communication transceiver 140. The DC powerline communication transceiver 140 communicates with the data network 20.

AC to DC PLC Transceiver and Power Supply

Figure 3:
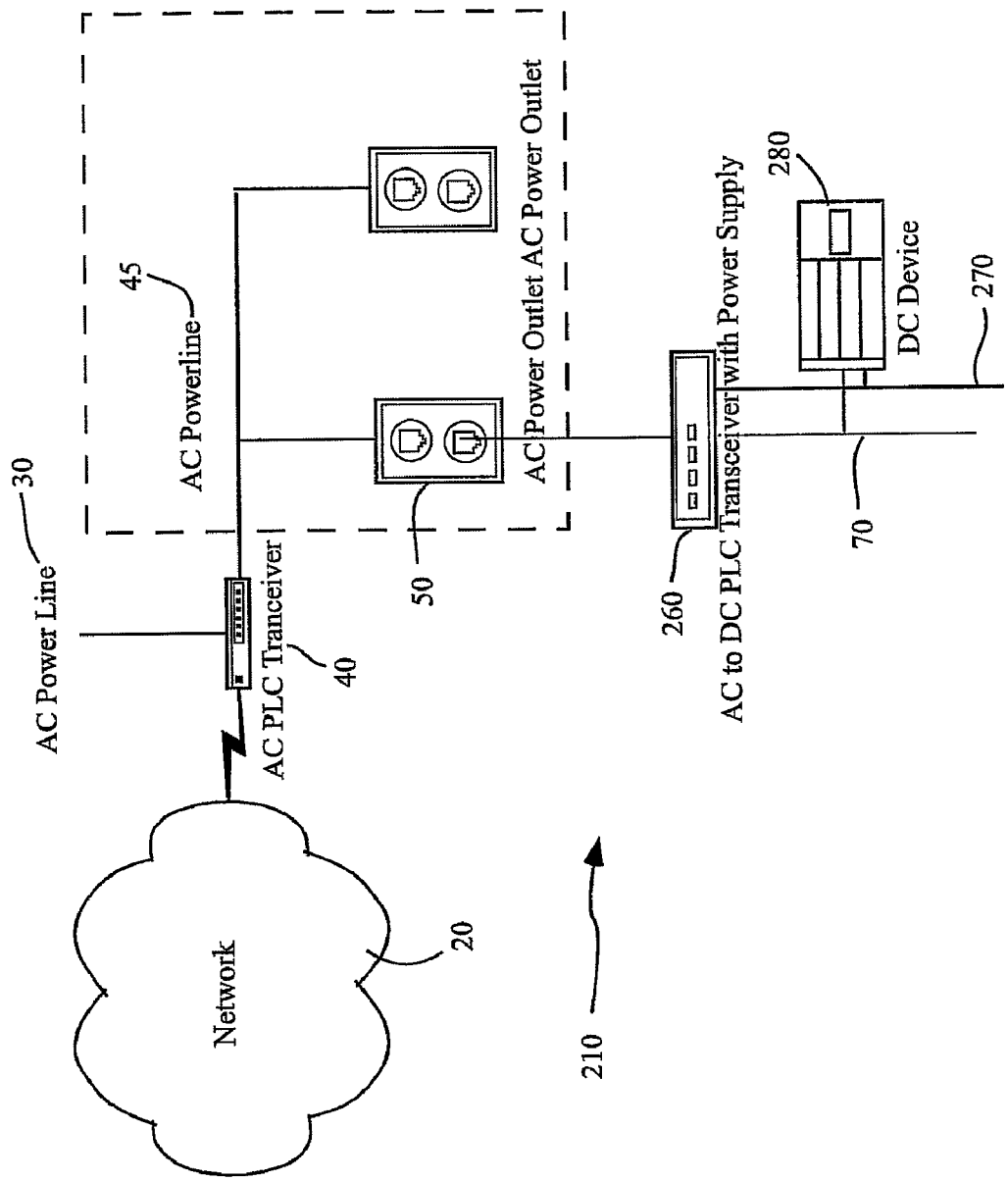
FIG. 3 is a systems diagram of a powerline communication network, such as is shown in FIG. 1, also showing the DC PLC Device being supplied power by the AC to DC powerline communication transceiver.

Referring now to FIG. 3, a system diagram is shown of another embodiment of a powerline communication network where an AC to DC powerline communication transceiver also has a separate DC power supply line 270. This embodiment is for devices that will require DC powerline communication network and also require a voltage supply that differs from the DC powerline communication network.

The data network 20 is connected to the AC powerline communication transceiver 40. The AC powerline communication transceiver 40 is connected to the AC power line 40 and the AC powerline communications network 45. The AC powerline communications network 45 is connected to the AC powerline communications transceiver 40 and the AC power outlet 50. The AC to DC powerline communications transceiver with power supply 260 is connected to the AC power outlet 50, a DC powerline communications network 70, a DC device power 270, and a DC device with supply 280. The DC Device with supply 280 is electrically connected to the DC powerline communication network 70 and the DC device powerline 270.

During operation, the data network 20 provides data packets (not shown) that are encoded by the AC powerline communication transceiver 40 on the AC power line 30 to create AC powerline communication network 45. The AC powerline communication network 45 is available at the AC power outlet 50. Devices plugged into the AC wall outlet 50, receive the AC powerline communication network 45. The AC to DC powerline communication transceiver with power supply 260 provides DC powerline communication network 70 and provides a DC device powerline 270 for the DC device 280.

Data can be sent from the DC device with supply 280 to the AC to DC powerline communication transceiver with power supply 260 using the DC powerline communication network 70. This data is then sent to the AC powerline communication transceiver 40 via the AC powerline communication network 45. The AC powerline communication transceiver 40 receives the data form the AC powerline communication network and transmits it to the Data network 20.

AC to DC PLC Transceiver and Peripheral Devices

Figure 4:
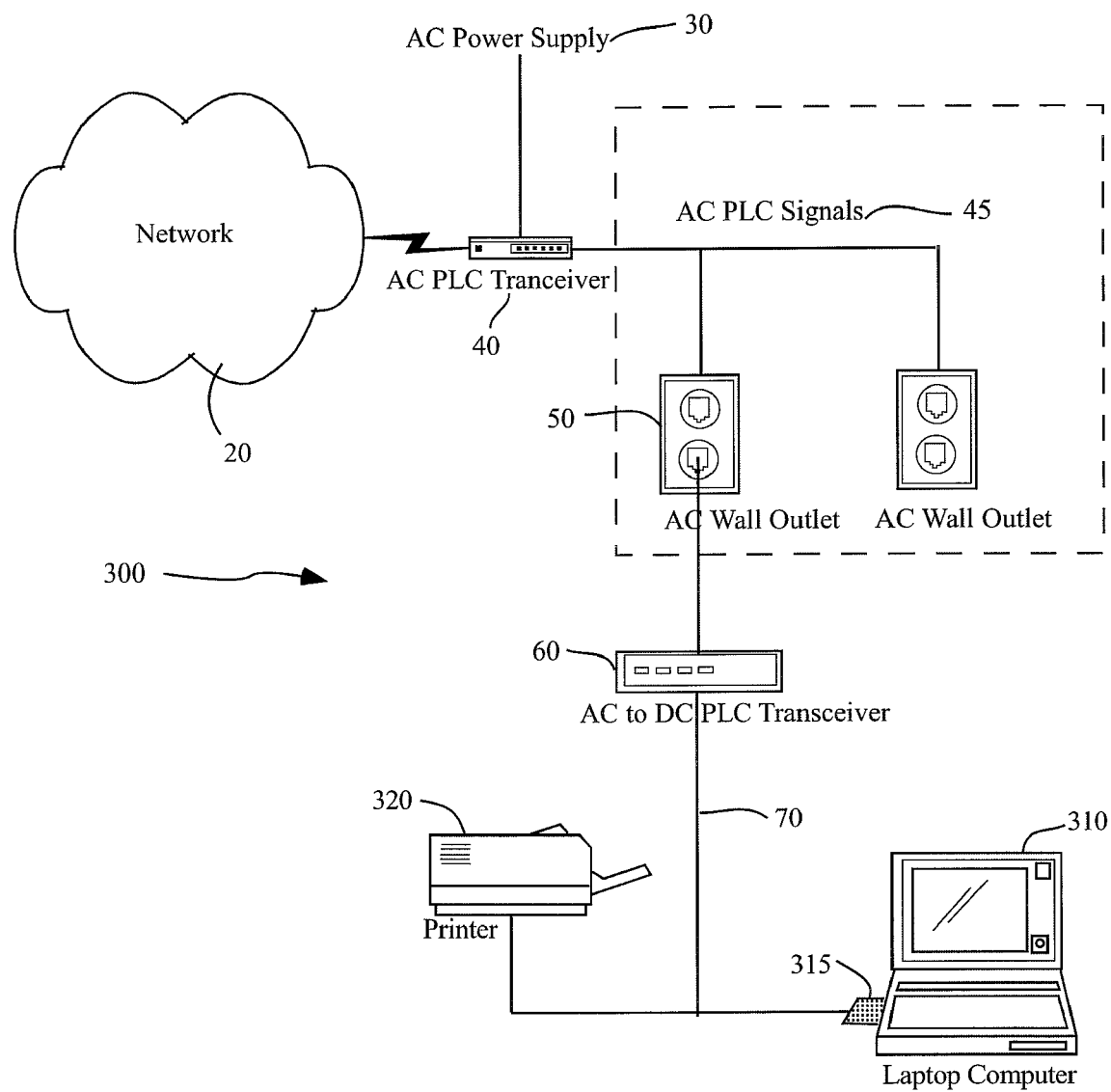
FIG. 4 is a diagram of a powerline communication network as shown in FIG. 1, showing the use of a laptop computer with a DC powerline communication transceiver interface.

Referring now to FIG. 4, a system diagram is shown of another embodiment of a powerline communication network where the AC to DC powerline communication transceiver is connected to peripheral devices 300.

The data network 20 is connected to the AC powerline communication transceiver 40. The AC powerline communication transceiver 40 is connected to the AC power line 40 and the AC powerline communications network 45. The AC powerline communications network 45 is connected to the AC powerline communications transceiver 40 and the AC power outlet 50. The AC to DC powerline communications transceiver 60 is connected to the AC power outlet 50, the DC powerline communications network 70, a DC laptop adapter 315, and a DC printer adapter 325. The DC laptop adapter 315 is connected to a laptop 310 and the DC printer adapter 320 is connected to a printer 320.

During operation, the data network 20 provides data packets (not shown) that are encoded by the AC powerline communication transceiver 40 on the AC power line 30 to create the AC powerline communication network 45. The AC powerline communication network 45 is available at the AC power outlet 50. Devices plugged into the AC wall outlet 50, receive the AC powerline communication network 45. The AC to DC powerline communication transceiver 60 sends and receives data packets to the laptop computer 310 and the printer 320.

In the prior examples an AC to DC powerline transceiver is used to interconnect AC powerline communication signals with DC powerline communication signals. The implementation of this transceiver may be accomplished in a various configurations, including, but not limited to bridge, router, and repeater designs.

AC PLC to DC PLC Bridge

Figure 5:
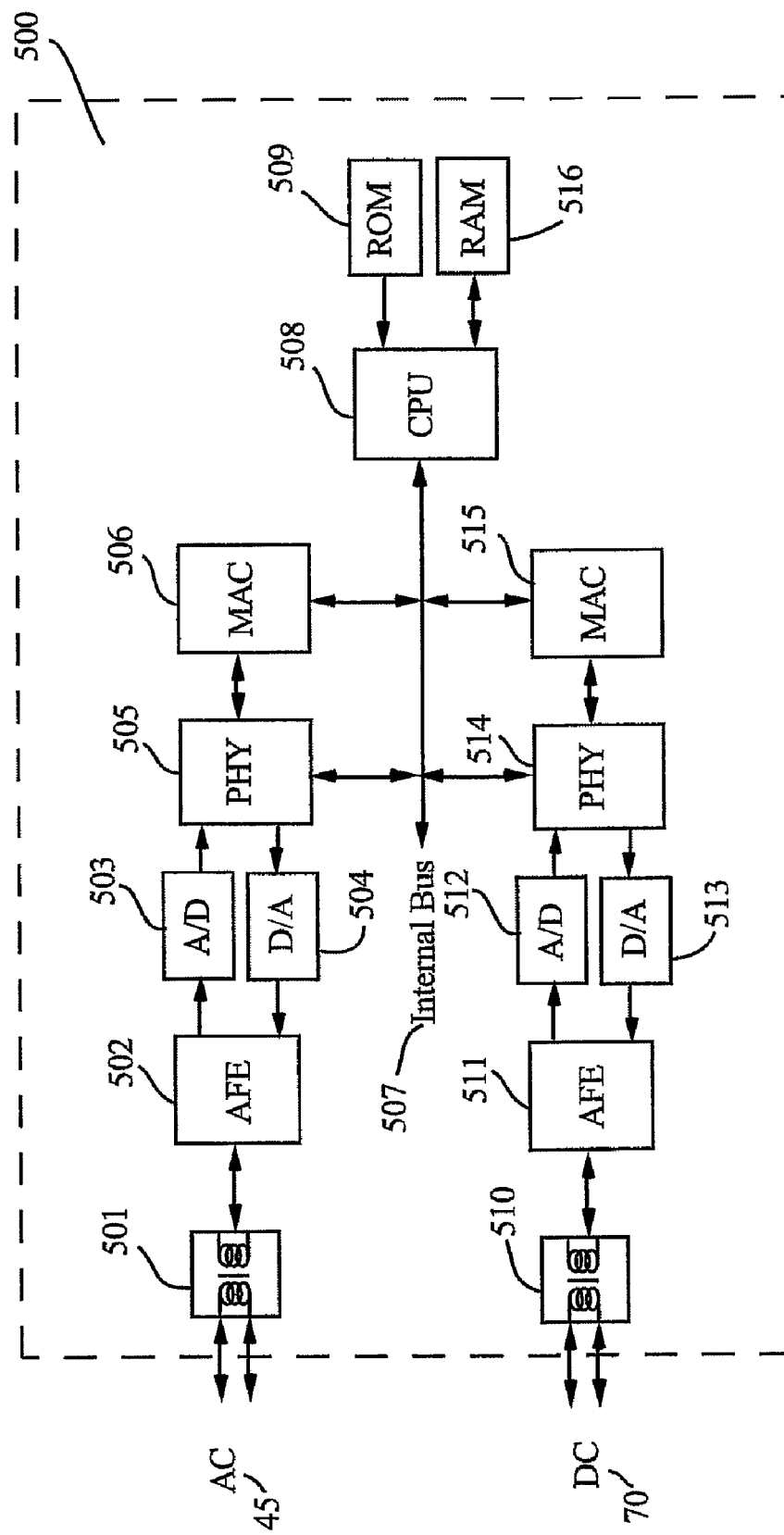
FIG. 5 is a block diagram of one embodiment of an AC PLC to DC powerline communication bridge, such as can be used in the power communication network FIG. 1.

Referring now to FIG. 5, a block diagram 500 of the AC to DC powerline communication transceiver 60 is shown. In this embodiment, the AC powerline communication network 45 and the DC powerline communication network 70 are coupled using a bridge configuration. The bridge configuration utilizes a computer to process the data.

As shown in FIG. 5, an first coupling transformer 501 is connected to a AC Analog Front End 502 (AC AFE). The AC AFE 502 is connected to an AC Analog to Digital Converter 503 (AC A/D) and an AC Digital to Analog Converter 504 (AC D/A) converter. The AC A/D converter 503 and the AC D/A converter 504 are connected to a AC Physical layer 505 (AC PHY). The AC PHY 504 is connected to an AC Media Access Control 506 (AC MAC) 506 and an internal bus 507. The AC MAC 506 is connected to the AC PHY 505 and the internal bus 507. A central processing unit 508 (CPU) is connected to the internal bus 507, a read only memory 508 (ROM), and a random access memory 516 (RAM).

Referring again to FIG. 5, a second coupling transformer 510 is connected to a DC Analog Front End 511 (DC AFE). The DC AFE 511 is connected to the DC Analog to Digital Converter 512 (DC A/D) and a DC Digital to Analog Converter 513 (DC D/A) converter. The DC A/D converter 512 and the DC D/A converter 513 are connected to a 514 DC Physical layer (DC PHY). The DC PHY 514 is connected to a DC Media Access Control 515 (DC MAC) and the internal bus 507. The DC MAC 515 is connected to the DC PHY 505 and the internal bus 507.

During operation, the AC powerline communication network 45 is received by the first coupling transformer 501 and the AC AFE 502 blocking the AC power voltage of 100-240 Volts AC using a high-pass filter. The AC A/D converter 503 converts the signal from the AC Analog Front End 502 into digital data. The AC PHY 505 converts the incoming data into AC MAC 506 data packets. The AC MAC 506 transfers the data to the CPU 508 via the internal bus 507.

Data transferred from the AC MAC 506 via the internal bus 507 is copied into the RAM 516 or if necessary directly into the DC Media Acces layer 515, by operation of a program stored in either the ROM 509 or the RAM 516.

Again referring to FIG. 5, the DC powerline communication network 70 is received by the second coupling transformer 510. The DC AFE 511 blocks the DC power voltage from the DC powerline communication network 70 the data components using a high-pass filter. The data components are converted to serial digital data using the DC A/D 512. The DC PHY 514 receives the bytes and reconstructs the MAC data packet suitable for the DC MAC 515. The data received from the DC MAC 515 is placed on the internal bus 507 by the CPU 508 under control by software in the ROM 509 and RAM 516.

In another embodiment, the components associated with the AC interface (e.g. first coupling transformer 501, AC Analog Front End 502, AC Analog to Digital Converter 503, AC Digital to Analog Converter 504, AC Physical Layer 505, AC Media Access Layer 506) are identical to the DC interface (e.g. second coupling transformer 510, DC Analog Front End 511, DC Analog to Digital Converter 512, DC Digital to Analog Converter, DC Physical Layer 514, and the DC Media Access Layer 515) and therefore only one set of components may be needed in actual implementation by using appropriate front end switching.

Sending data to the DC powerline communication network 70 involves transferring data from the RAM 516 to the DC MAC 506 using the internal bus 507 and the CPU 508. Alternatively, the data from the AC Media Access Control 506 may be sent directly to the DC Media Access Control 515. The DC MAC 515 packetizes data from the DC Media Access Control 515 and sends the individual data bytes to the DC PHY 514. The DC D/A 513 convert the digital data to analog signals and sends these signals on the DC powerline communication network 70.

The implementation of the AC to DC PLC bridge 500 does not have to be limited to a single AC PLC to DC PLC interface. The AC to DC PLC bridge may have several AC PLC interfaces (not shown) and a single DC PLC interface. Alternately, a single AC powerline communication interface can connect to a multiple DC powerline communication interfaces (not shown). Likewise, the AC to DC powerline communication interface may have many AC powerline communication interfaces (not shown) to many DC powerline communication interfaces (not shown).

The AC to DC powerline communication bridge 500 does not necessarily have to have dedicated ports in either the AC powerline communication format or the DC powerline communication format. In another embodiment, the AC Analog Front End (AC AFE) and the DC Analog Front End (DC AFE) ports will automatically detect whether the incoming signal is the AC powerline communication network 45 or DC powerline communication network 70. When the format of the input signal, either AC powerline communication or DC powerline communication, is detected the port will select the proper format accordingly.

The AC to DC powerline communication bridge 500 may allow for buffering of data packets from the AC MAC layer 506 or the DC MAC layer 515.

The AC to DC powerline communication bridge 500 may execute application specific programs that are stored in the ROM 509 or RAM 516. These application specific programs would process the incoming data packets. For example, a virus checking program could check packets to prevent corrupt data packets from crossing the AC powerline communication network 45 to the DC powerline communication network 70.

Another example of an application specific program that is stored in the ROM 509 or RAM 516 would be diagnostic programs. These diagnostic programs can gather statistics from the AC powerline communication network 45 or the DC powerline communication network 70. If the received signals deviate from the specification, for example due to line noise, this information may be recorded in the AC to DC powerline communication bridge 500 for later retrieval.

AC PLC to DC PLC Router

Figure 6:
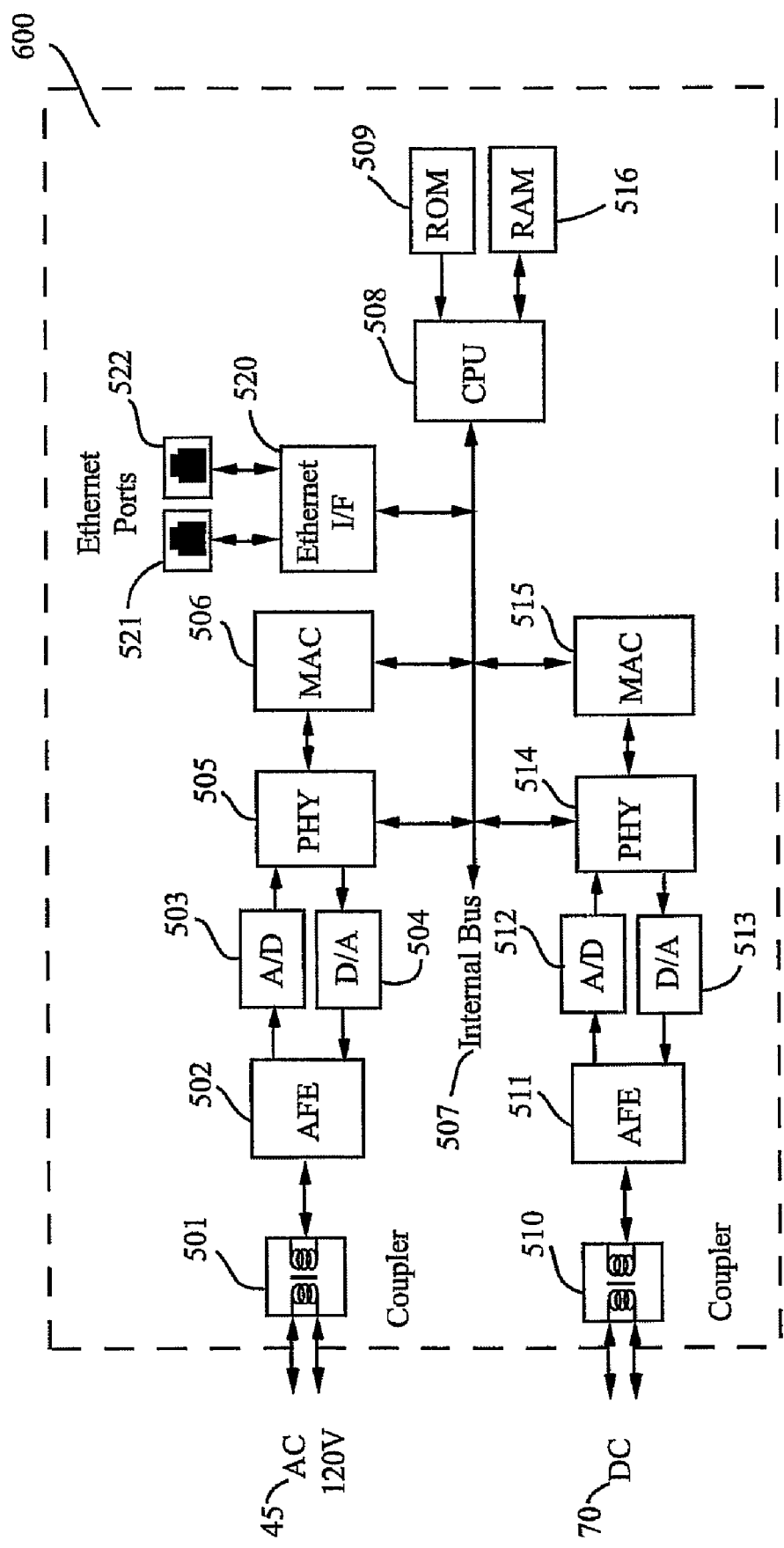
FIG. 6 is a block diagram of another embodiment of the AC to DC powerline communication bridge of FIG. 5, such as can be used in the powerline communication network of FIG. 3.

An embodiment of the AC to DC PLC Transceiver is the AC to DC powerline communication router 600 as shown in FIG. 6. The purpose of the router is to interface the AC powerline communication network 45 and the DC powerline communication network 70 with other data communication standards. Also, the DC powerline communication network 70 may be interfaced to other standards without the use of the AC powerline communication standard.

As shown in FIG. 6, an first coupling transformer 501 is connected to the AC Analog Front End 502 (AC AFE). The AC AFE 502 is connected to the AC Analog to Digital Converter 503 (AC A/D) and the AC Digital to Analog Converter 504 (AC D/A) converters. The AC A/D converter 503 and the AC D/A converter 504 are connected to the AC Physical layer 505 (AC PHY). The AC PHY 504 is connected to the AC Media Access Control 506 (AC MAC) and the internal bus 507. The AC MAC 506 is connected to the AC PHY 505 and the internal bus 507. A central processing unit 508 (CPU) is connected to the internal bus 507, the read only memory 508 (ROM), and the random access memory 516 (RAM).

Referring again to FIG. 6, a second coupling transformer 510 is connected to the DC Analog Front End 511 (DC AFE). The DC AFE 511 is connected to the DC Analog to Digital Converter 512 (DC A/D) and the DC Digital to Analog Converter 513 (DC D/A) converters. The DC A/D converter 512 and the DC D/A converters 513 are connected to the 514 DC Physical layer (DC PHY). The DC PHY 514 is connected to the DC Media Access Control 515 (DC MAC) and the internal bus 507. The DC MAC 515 is connected to the DC PHY 505 and the internal bus 507.

Interfaces to other protocols (e.g. ethernet) are shown in FIG. 6. An Ethernet port 521,522 are connected to an ethernet interface 520. The ethernet interface 520 is connected to the internal bus 507.

Now referring to FIG. 6. The operation of the AC to DC powerline communication router 600 the same as to the AC to DC powerline communication bridge 500 as shown in FIG. 5. AC powerline communication network 45 are processed by the first coupling transformer 501, the AC AFE 502 (AC AFE), the AC A/D 503, the AC D/A 504, the AC PHY 505, the AC MAC 506, and eventually stored in RAM 516 under programmatic control. DC powerline communication network 70 are processed by the second coupling transformer 510, the DC AFE 511, the DC D/A 513, the DC A/D 512, the DC PHY 514, and the DC MAC 515.

To implement another protocol, an interface is connected to the internal bus 507 of the device. In this example, ethernet ports 521, 522 connected to devices that conform to the ethernet standard. These widely available devices are connected to these ports and would include computers, switches, wireless devices, and dedicated devices, such as, digital cameras. The ethernet interface (I/F) 520 converts the ethernet data into a higher layer format from the ethernet ports to the parallel internal bus 507.

The AC to DC powerline communication router 600 operates by allowing data AC powerline communication network 45 or the DC powerline communication network 70 to transfer data packets to the internal bus 507 using the aforementioned circuitry (i.e. the analog front end, the analog to digital conversion, the physical layer, and the media access control layer). The data packets are stored in the RAM 516 by the CPU 508. Upon programmatic control, the data packets sent by the AC PLC interfaces or the DC PLC interface are converted into a standard acceptable by the Ethernet interface 520.

In another embodiment, the ethernet interface 520 is used as an AC to DC powerline communication monitoring device. Because ethernet is in widespread use, a portable computer (not shown) supporting the ethernet standard may be connected to the ethernet interface on the AC to DC powerline communication router 600.

In another embodiment, the ethernet interface 520 may also be used to configure and control the AC powerline communication or DC powerline communication interfaces. This is accomplished by modification of software settings in the RAM 516 to prevent or limit access to the AC powerline communication or DC powerline communication interfaces.

AC PLC to DC PLC Repeater

Figure 7:
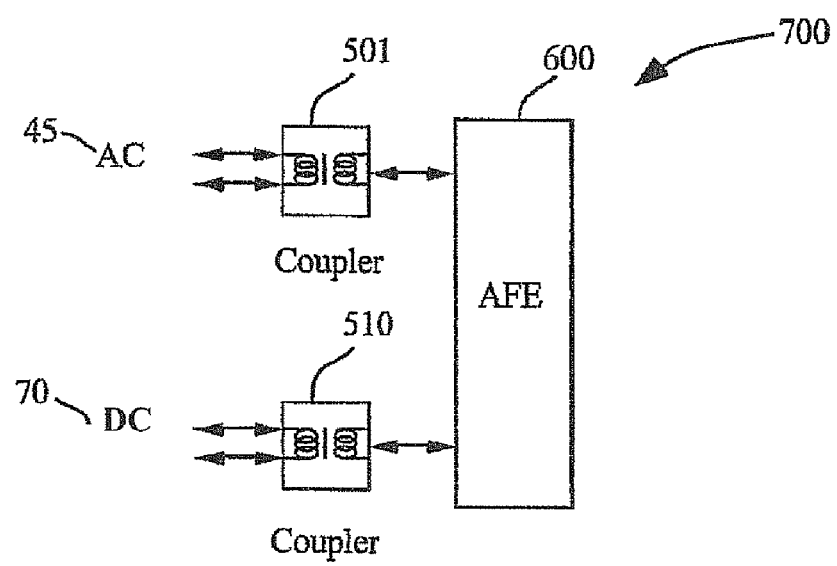
FIG. 7 is a block diagram of one embodiment an AC to DC powerline communication repeater, such as can be used in the powerline communication network of FIG. 1.

Another embodiment of the AC PLC to DC PLC transceiver is the AC to DC powerline communication repeater 700 as shown in FIG. 7. The purpose of the repeater is the interface the AC PLC and DC PLC standards using a device that is not under software control.

Referring to FIG. 7, the AC to DC powerline communication repeater diagram 700 is shown. One side of the first coupling transformer 501 is connected to the AC powerline communication network 45. The other side of the first coupling transformer 501 is connected to an AC input on the Analog Front End 600. One side of the second coupling transformer 510 is connected to the DC powerline communication network 70. The other side of the second coupling transformer 510 is connected to the DC input on the Analog Front End 600.

The operation of the AC to DC powerline communication repeater is as follows. AC powerline communication network 45 that are present on the AC powerline communication network 45 side are transmitted to the DC powerline communication network 70. Similarly, signals that appear on the DC powerline communication network 70 are transmitted to the AC powerline communication network 45. This signal transformation is accomplished with analog circuitry contained in the analog front end 600.

Those skilled in the art will recognize upon consideration of the above teachings, that certain of the above exemplary embodiments are based upon the use of DC Powerline Communications. However, the invention is not limited to such exemplary embodiments. Those skilled in the art will recognize that there are many alternatives and modifications apparent from the foregoing description.

What is claimed:

1. A powerline communication transceiver, comprising:
   a first coupling transformer being interfaceable with an AC powerline communication network;
   an AC analog front end coupled with the first coupling transformer;
   an AC analog-to-digital converter coupled with the AC analog front end;
   an AC digital-to-analog converter coupled with the AC analog front end;
   an AC physical layer coupled with both the AC analog-to-digital converter and the AC digital-to-analog converter;
   an AC media access control coupled with the AC physical layer;
   a second coupling transformer being interfaceable with a DC powerline communication network;
   a DC analog front end coupled with the second coupling transformer;
   a DC analog-to-digital converter coupled with the DC analog front end;

a DC digital-to-analog converter coupled with the DC analog front end;
a DC physical layer coupled with both the DC analog-to-digital converter and the DC digital-to-analog converter;
a DC media access control coupled with the DC physical layer;
an internal bus coupled with the AC physical layer and the DC physical layer as well as both the AC media access control and the DC media access control;
a random-access memory;
a read-only memory; and
a central processing unit coupled with the internal bus as well as with both the random-access memory and the read-only memory,
wherein the AC analog-to-digital converter and the AC digital-to-analog converter, together, forming a pair of AC signal converters, are operable in parallel relation to one another,
wherein the DC analog-to-digital converter and the DC digital-to-analog converter, together, forming a pair of DC signal converters, are operable in parallel relation to one another,
wherein the first coupling transformer, the AC analog front end, and the pair of AC signal converters are operable in serial relation to one another and to the AC powerline communication network, the AC powerline communication network transmitting at least one type of data signal being generated by the powerline communication transceiver when a data network is connected to the AC powerline communication network, and the data network conveying at least one data packet,
wherein the second coupling transformer, the DC analog front end, and the pair of DC signal converters are operable in serial relation to one another and to the DC powerline communication network, the DC powerline communication network transmitting at least one type of data signal being generated by the powerline communication transceiver when the data network is connected to the DC powerline communication network, and the data network conveying another at least one data packet,
wherein the at least one data packet and the another at least one data packet each comprises a data type selected from a group consisting of proprietary data and nonproprietary data,
wherein the first coupling transformer is adapted to receive at least one signal from the AC powerline communication network, and
wherein the second coupling transformer is adapted to receive at least one signal from the DC powerline communication network,
wherein each AC signal converter of the pair of AC signal converters effects at least one signal conversion selected from a group consisting essentially of a conversion of at least one first data signal to at least one AC powerline communication signal and a conversion of at least one AC powerline communication signal to at least one first data signal,
wherein each DC signal converter of the pair of DC signal converters effects at least one signal conversion selected from a group consisting essentially of a conversion of at least one second data signal to at least one DC powerline communication signal and a conversion of at least one DC powerline communication signal to at least one second data signal,
wherein the AC analog front end is adapted to received at least one signal from the first coupling transformer,
wherein the DC analog front end is adapted to receive at least one signal from the second coupling transformer,
wherein the at least one DC powerline communication signal is sent to the second coupling transformer from the DC analog front end,
wherein the at least one AC powerline communication signal is sent to the first coupling transformer from the AC analog front end.

2. The transceiver of claim 1,
wherein an AC power voltage is blockable by the AC analog front end, and
wherein a DC power voltage is blockable by the DC analog front end.

3. The transceiver of claim 1,
wherein the AC analog front end comprises a high-pass filter, and
wherein the DC analog front end comprises a high-pass filter.

4. The transceiver of claim 1,
wherein the AC physical layer is capable of converting digital data into the at least one data packet, and
wherein the DC physical layer is capable of converting digital data into the another at least one data packet.

5. The transceiver of claim 4,
wherein the AC media access control is capable of transferring the at least one data packet, via the internal bus by operation of a program being storable on an element selected from a group consisting essentially of the read-only memory and the random-access memory, to an element selected from a group consisting essentially of the random-access memory via the central processing unit and the DC media access control, and
wherein the DC media access control is capable of transferring the another at least one data packet, via the internal bus by operation of another program being storable on an element selected from a group consisting essentially of the read-only memory and the random-access memory, to an element selected from a group consisting essentially of the random-access memory via the central processing unit and the AC media access control.

6. The transceiver of claim 1, further comprising an interface to at least one protocol, the interface coupled with the internal bus.

7. The transceiver of claim 6,
wherein the at least one protocol comprises Ethernet, and
wherein the interface is coupled with at least one Ethernet port.

8. The transceiver of claim 1, further comprising an interface to at least one protocol,
wherein the at least one protocol comprises Ethernet,
wherein the interface is coupled with at least one Ethernet port,
wherein an AC power voltage is blockable by the AC analog front end,
wherein a DC power voltage is blockable by the DC analog front end,
wherein the AC analog front end comprises a high-pass filter,
wherein the DC analog front end comprises a high-pass filter,
wherein the AC analog-to-digital converter is capable of converting an analog signal from the AC analog front end into digital data,
wherein the DC analog-to-digital converter is capable of converting an analog signal from the DC analog front end into digital data, wherein the AC digital-to-analog converter is capable of converting digital data from the AC physical layer into an analog signal, wherein the DC digital-to-analog converter is capable of converting digital data from the DC physical layer into an analog signal, wherein the AC physical layer is capable of converting digital data into the at least one data packet, wherein the DC physical layer is capable of converting digital data into the another at least one data packet, wherein the AC media access control is capable of transferring the at least one data packet, via the internal bus by operation of a program being storable on an element selected from a group consisting essentially of the read-only memory and the random-access memory, to an element selected from a group consisting essentially of the random-access memory via the central processing unit and the DC media access control, and wherein the DC media access control is capable of transferring the another at least one data packet, via the internal bus by operation of another program being storable on an element selected from a group consisting essentially of the read-only memory and the random-access memory, to an element selected from a group consisting essentially of the random-access memory via the central processing unit and the AC media access control.

9. A method of fabricating a powerline communication transceiver, comprising:

providing a first coupling transformer being interfaceable with an AC powerline communication network;

providing an AC analog front end coupled with the first coupling transformer;

providing an AC analog-to-digital converter coupled with the AC analog front end;

providing an AC digital-to-analog converter coupled with the AC analog front end;

providing an AC physical layer coupled with both the AC analog-to-digital converter and the AC digital-to-analog converter;

providing an AC media access control coupled with the AC physical layer;

providing a second coupling transformer being interfaceable with a DC powerline communication network;

providing a DC analog front end coupled with the second coupling transformer;

providing a DC analog-to-digital converter coupled with the DC analog front end;

providing a DC digital-to-analog converter coupled with the DC analog front end;

providing a DC physical layer coupled with both the DC analog-to-digital converter and the DC digital-to-analog converter;

providing a DC media access control coupled with the DC physical layer;

providing an internal bus coupled with the AC physical layer and the DC physical layer as well as both the AC media access control and the DC media access control;

providing a random-access memory;

providing a read-only memory; and providing a central processing unit coupled with the internal bus as well as with both the random-access memory and the read-only memory, wherein the steps of providing the AC analog-to-digital converter and providing the AC digital-to-analog converter, together, comprise providing a pair of AC signal converters being operable in parallel relation to one another, wherein the steps of providing the DC analog-to-digital converter and the steps of providing the DC digital-to-analog converter, together, comprise providing a pair of DC signal converters, being operable in parallel relation to one another, wherein the first coupling transformer, the AC analog front end, and the pair of AC signal converters are provided as being operable in serial relation to one another and to the AC powerline communication network, the AC powerline communication network transmitting at least one type of data signal being generated by the powerline communication transceiver when a data network is connected to the AC powerline communication network, and the data network conveying at least one data packet, wherein the second coupling transformer, the DC front end, and the pair of DC signal converters are provided as being operable in serial relation to one another and to the DC powerline communication network, the DC powerline communication network transmitting at least one type of data signal being generated by the powerline communication transceiver when the data network is connected to the DC powerline communication network, and the data network conveying another at least one data packet, wherein the at least one data packet and the another at least one data packet each comprises a data type selected from a group consisting of proprietary data and nonproprietary data, wherein the first coupling transformer is adapted to receive at least one signal from the AC powerline communication network, and wherein the second coupling transformer is adapted to receive at least one signal from the DC powerline communication network, wherein each AC signal converter of the pair of AC signal converters effects at least one signal conversion selected from a group consisting essentially of a conversion of at least one first data signal to at least one DC powerline communication signal and a conversion of at least one DC powerline communication signal to at least one first data signal, wherein each DC signal converter of the pair of DC signal converters effects at least one signal conversion selected from a group consisting essentially of a conversion of at least one second data signal to at least one AC powerline communication signal and a conversion of at least one AC powerline communication signal to at least one second data signal, wherein the AC analog front end is adapted to received at least one signal from the first coupling transformer, wherein the DC analog front end is adapted to receive at least one signal from the second coupling transformer, wherein the at least one DC powerline communication signal is sent to the second coupling transformer from the AC analog front end, wherein the at least one AC powerline communication signal is sent to the first coupling transformer from the DC analog front end.

10. The method of claim 9, further comprising providing an interface to at least one protocol, the interface coupled with the internal bus.

11. The method of claim 10, wherein the interface to at least one protocol providing step comprises providing Ethernet, and wherein the interface to at least one protocol providing step comprises coupling the interface with at least one Ethernet port.

12. A powerline communication transceiver, comprising:
a first coupling transformer being interfaceable with an AC powerline communication network;
a second coupling transformer being interfaceable with a DC powerline communication network; and
an analog front end coupled with both the first coupling transformer and the second coupling transformer,
wherein first coupling transformer and the analog front end are operable in serial relation to one another and to the AC powerline communication network, the AC powerline communication network providing means for transmitting at least one type of data signal being generated by the powerline communication transceiver when a data network is connected to the AC powerline communication network, and the data network conveying at least one data packet,
wherein the second coupling transformer and the analog front end are operable in serial relation to one another and to the DC powerline communication network, the DC powerline communication network providing means for transmitting at least one type of data signal being generated by the powerline communication transceiver when the data network is connected to the DC powerline communication network, and the data network conveying another at least one data packet,
wherein the at least one data packet and the another at least one data packet each comprises a data type selected from a group consisting of proprietary data and nonproprietary data,
wherein the first coupling transformer is adapted to receive at least one signal from the AC powerline communication network, and
wherein the second coupling transformer is adapted to receive at least one signal from the DC powerline communication network,
wherein the analog front end is adapted to received at least one signal from the first coupling transformer,
wherein the analog front end is adapted to receive at least one signal from the second coupling transformer,
wherein the at least one DC powerline communication signal is sent to the second coupling transformer from the analog front end, and
wherein the at least one AC powerline communication signal is sent to the first coupling transformer from the analog front end.

13. The transceiver of claim 12,
wherein an AC power voltage is blockable by the analog front end, and
wherein a DC power voltage is blockable by the analog front end.

14. The transceiver of claim 12, wherein the analog front end comprises a high-pass filter.

15. The transceiver of claim 12, wherein the analog front end comprises analog circuitry.

16. The transceiver of claim 12,
wherein the at least one signal from the AC powerline communication network, is transmitted to the analog front end,
wherein the at least one signal from the AC powerline communication network, is transformed by the analog front end, and
wherein the at least one signal from the AC powerline communication network and transformed by the analog front end, is transmitted from the analog front end to the DC powerline communication network.

17. The transceiver of claim 12,
wherein an AC power voltage is blockable by the analog front end,
wherein a DC power voltage is blockable by the analog front end,
wherein the analog front end comprises a high-pass filter, and
wherein the analog front end comprises analog circuitry.

18. The transceiver of claim 12,
wherein the at least one signal from the DC powerline communication network, is transmitted to the analog front end,
wherein the at least one signal from the DC powerline communication network, is transformed by the analog front end, and
wherein the at least one signal from the DC powerline communication network and transformed by the analog front end, is transmitted from the analog front end to the AC powerline communication network.

19. A method of fabricating a powerline communication transceiver, comprising:
providing a first coupling transformer being interfaceable with an AC powerline communication network;
providing a second coupling transformer being interfaceable with a DC powerline communication network; and
providing an analog front end coupled with both the first coupling transformer and the second coupling transformer,
wherein the first coupling transformer and the analog front end are provided as being operable in serial relation to one another and to the AC powerline communication network, the AC powerline communication network providing means for transmitting at least one type of data signal being generated by the powerline communication transceiver when a data network is connected to the AC powerline communication network, and the data network conveying at least one data packet,
wherein the second coupling transformer and the analog front end are provided as being operable in serial relation to one another and to the DC powerline communication network, the DC powerline communication network providing means for transmitting at least one type of data signal being generated by the powerline communication transceiver when the data network is connected to the DC powerline communication network, and the data network conveying another at least one data packet,
wherein the at least one data packet and the another at least one data packet each comprises a data type selected from a group consisting of proprietary data and nonproprietary data,
wherein the first coupling transformer is adapted to receive at least one signal from the AC powerline communication network, and
wherein the second coupling transformer is adapted to receive at least one signal from the DC powerline communication network,
wherein the analog front end is adapted to received at least one signal from the first coupling transformer,
wherein the analog front end is adapted to receive at least one signal from the second coupling transformer,
wherein the at least one DC powerline communication signal is sent to the DC coupling transformer from the analog front end, and
wherein the at least one AC powerline communication signal is sent to the first coupling transformer from the analog front end.

20. A method of interfacing one type of data signal with another type of data signal by way of a powerline communication transceiver, comprising:
providing the powerline communication transceiver;
receiving at least one data signal of one type via at least one powerline communication interface;
converting the at least one data signal into at least one data packet via the powerline communication transceiver; and
converting the at least one data packet into at least one data signal of another type via the powerline communication transceiver,
wherein the powerline communication transceiver providing step comprises:
providing a first coupling transformer being interfaceable with an AC powerline communication network;
providing an AC analog front end coupled with the first coupling transformer;
providing an AC analog-to-digital converter coupled with the AC analog front end;
providing an AC digital-to-analog converter coupled with the AC analog front end;
providing an AC physical layer coupled with both the AC analog-to-digital converter and the AC digital-to-analog converter;
providing an AC media access control coupled with the AC physical layer;
providing a second coupling transformer being interfaceable with a DC powerline communication network;
providing a DC analog front end coupled with the second coupling transformer;
providing a DC analog-to-digital converter coupled with the DC analog front end;
providing a DC digital-to-analog converter coupled with the DC analog front end;
providing a DC physical layer coupled with both the DC analog-to-digital converter and the DC digital-to-analog converter;
providing a DC media access control coupled with the DC physical layer;
providing an internal bus coupled with the AC physical layer and the DC physical layer as well as both the AC media access control and the DC media access control;
providing a random-access memory;
providing a read-only memory; and
providing a central processing unit coupled with the internal bus as well as with both the random-access memory and the read-only memory,
wherein the steps of providing the AC analog-to-digital converter and providing the AC digital-to-analog converter, together, comprise providing a pair of AC signal converters being operable in parallel relation to one another,
wherein the steps of providing the DC analog-to-digital converter and the steps of providing the DC digital-to-analog converter, together, comprise providing a pair of DC signal converters, being operable in parallel relation to one another,
wherein the first coupling transformer, the AC analog front end, and the pair of AC signal converters are provided as being operable in serial relation to one another and to the AC powerline communication network, the AC powerline communication network providing means for transmitting at least one type of data signal being generated by the powerline communication transceiver when a data network is connected to the AC powerline communication network, and the data network conveying at least one data packet,
wherein the second coupling transformer, the DC front end, and the pair of DC signal converters are provided as being operable in serial relation to one another and to the DC powerline communication network, the DC powerline communication network providing means for transmitting at least one type of data signal being generated by the powerline communication transceiver when the data network is connected to the DC powerline communication network, and the data network conveying another at least one data packet,
wherein the at least one data packet and the another at least one data packet each comprises a data type selected from a group consisting of proprietary data and nonproprietary data,
wherein the first coupling transformer is adapted to receive at least one signal from the AC powerline communication network, and
wherein the second coupling transformer is adapted to receive at least one signal from the DC powerline communication network,
wherein each AC signal converter of the pair of AC signal converters effects at least one signal conversion selected from a group consisting essentially of a conversion of at least one first data signal to at least one DC powerline communication signal and a conversion of at least one DC powerline communication signal to at least one first data signal,
wherein each DC signal converter of the pair of DC signal converters effects at least one signal conversion selected from a group consisting essentially of a conversion of at least one second data signal to at least one AC powerline communication signal and a conversion of at least one AC powerline communication signal to at least one second data signal,
wherein the AC analog front end is adapted to received at least one signal from the first coupling transformer,
wherein the DC analog front end is adapted to receive at least one signal from the second coupling transformer,
wherein the at least one DC powerline communication signal is sent to the second coupling transformer from the AC analog front end,
wherein the at least one AC powerline communication signal is sent to the first coupling transformer from the DC analog front end.

21. The method of claim 20, further comprising:
filtering the at least one data signal of one type; and
transmitting the at least one DC powerline communication signal.

22. The method of claim 20, wherein the at least one data packet converting step comprises:
converting the at least one AC powerline communication signal into at least one DC powerline communication signal; and
conditioning the at least one DC powerline communication signal.

* * * * *